United States Patent [19]

Ferchau et al.

[11] Patent Number: 5,201,153
[45] Date of Patent: Apr. 13, 1993

[54] BREAKOUT PANEL CONSTRUCTION

[75] Inventors: Joerg U. Ferchau, Morgan Hill; Robert E. Smith, Woodside, both of Calif.

[73] Assignee: Tandem Computers Incorporated, Cupertino, Calif.

[21] Appl. No.: 737,862

[22] Filed: Jul. 30, 1991

[51] Int. Cl.$^5$ .............................. E04C 2/40
[52] U.S. Cl. ...................... 52/100; 220/3.2; 220/266
[58] Field of Search .............. 52/98, 100; 220/265, 220/266, 241, 3.2

[56] References Cited

U.S. PATENT DOCUMENTS 4,071,159  1/1978  Robinson et al. ............ 220/3.2
4,995,527  2/1991  Sauder et al. ............... 220/3.2

Primary Examiner—David A. Scherbel
Assistant Examiner—Christopher T. Kent
Attorney, Agent, or Firm—Townsend and Townsend

[57] ABSTRACT

A panel is provided with a plurality of breakout elements attached to one another, and the panel, by a plurality of tab-like protrusions formed on a non-viewable surface of the panel. The breakout elements are removed by twisting the tabs for the particular element to be removed, leaving any scoring resultant from tab removal on a non-viewed surface of the panel.

10 Claims, 1 Drawing Sheet

U.S. Patent    Apr. 13, 1993    5,201,153

BREAKOUT PANEL CONSTRUCTION

BACKGROUND OF THE INVENTION

The present invention is directed generally to a panel for use in forming an enclosure (e.g., cabinet) for a variety of products, and more particularly, to a panel construction for use as a front face or bezel of a cabinet, and having breakout elements that are held removably in place by twist-off tabs formed on a non-viewable surface of the panel when the panel is in use.

Panel construction has often included breakout elements in order to permit the panel to be used in more than one situation or environment. Such panel construction may be used when an opening is required on one occasion by removing a breakout element to create the required opening, and again by leaving the breakout element in place when no opening is required on other occasions. For example, panels used to form a faceplate or bezel of a cabinet that houses electronic equipment may be used alternately for different models of the same equipment. Certain models may require operator viewable readout elements or other operator viewable and-/or accessible apparatus in one version of a product, while such viewable and/or accessible elements/apparatus may be absent from other versions. In order to accommodate both versions, yet keep cost of manufacture down, such bezels can be constructed having breakout panels that are removed for the first version of the product, and left in place for the second version.

Typically, such panels or bezels are formed with scoring to identify the breakout element in one way or another. Often, unfortunately, removal of the breakout panel will result in a viewable scarring of, or "witnesses" being formed at or about, the periphery of the opening so formed. Although these witnesses can be colored or painted in order to minimize their presence and appearance, this is not an altogether satisfactory solution. In addition to increasing the labor cost in construction the panel, physical evidence of such witnesses left all to often remain.

At other times, removal of breakout panels can cause an unsightly crack to form in the panel, perhaps necessitating disposal of the panel in favor of another.

It can be seen, therefore, that there is a need for a panel construction having breakout element capability that will minimize or obviate unsightly scarring and viewable witnesses when the breakout elements are removed.

SUMMARY OF THE INVENTION

The present invention is directed to a panel construction having breakout element capability that can be easily and inexpensively manufactured.

According to the present invention, a panel is integrally constructed having a breakout element held in place by a plurality of frangible tab-like protrusions that bridge a gap formed in the panel to surround the outer periphery of the breakout element. The tabs are formed on a non-viewable surface of the panel when the panel is in place for use. The breakout element is removed by twisting the tabs. Any scarring or witnesses that may be left will be formed on a surface of the panel that is unseen when the panel is in use.

A number of advantages are achieved by the present invention. First, the frangible tabs allow removal of the breakout element without leaving unsightly, viewable scarring on the panel from which the breakout elements are removed. This feature, in turn, obviates the need for additional labor to mask any scarring or "witnesses" left be removal of the breakout element.

These and other aspects and advantages of the present invention will become apparent to those skilled in this art upon a reading of the following detailed description of the invention, which should be taken in conjunction with the accompanying drawings.

DETAILED DESCRIPTION OF THE INVENTION

Figure 1:
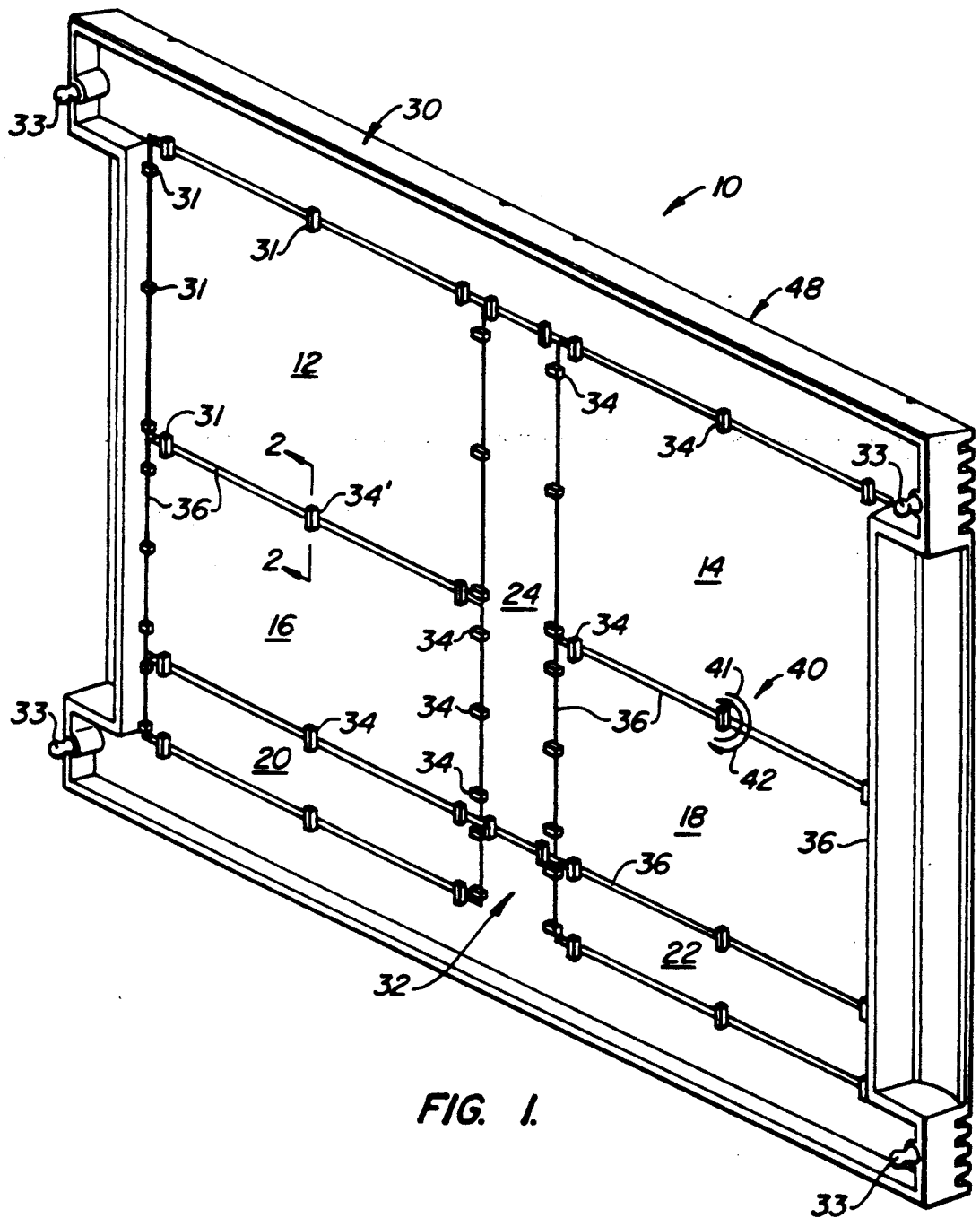
FIG. 1 is a perspective view of a panel construction for use as a front face or bezel of an enclosure, having a plurality of breakout panels held in place by frangible tabs.

Turning to the figures, and for the moment particularly FIG. 1, there is illustrated a panel constructed in accordance with the teachings of the present invention, and designated generally with the reference numeral 10. In the disclosed embodiment of the invention the panel 10 is constructed to form a bezel or faceplate for a cabinet that will house electronic apparatus (not shown) such as, for example, tape storage units, or disk drive units, or the like. In light of the fact that such electronics apparatus (not shown) housed in the cabinet may require external access, and that such access may differ, depending upon the apparatus housed in the cabinet, the panel 10 is provided with a plurality of breakout elements 12, 14, ..., 22, and 24, each individually separable from the panel 10. A frame 30 that encircles breakout elements 12, ..., 24 completes the construction of the panel 10.

Extending what would be rearwardly of the panel 10 are rear snap extensions 33. The snap extensions 33 are adapted to be received by apertures (not shown) formed in a cabinet (not shown) with which the panel 10 is to be used, to attach the panel to the cabinet.

The individual breakout elements 12, ..., 24 are held together, and to the frame 30, by rectangularly-shaped tabs 34 formed on a back surface 32 of the panel 10 to bridge interstitial openings or gaps 36 between the peripheries of each of the breakout elements 12, ..., 24 and/or the frame 30 of the panel 10.

Figure 2:
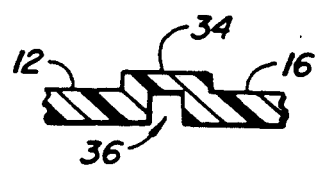
FIG. 2 is a partial cross-sectional view of one of the tabs shown in FIG. 1, illustrating its formation and construction.

As better illustrated in FIG. 2, which shows one of the tabs 34 in section, together with partial sections of adjoining breakout panels 12, 16, the tabs 34 are formed to bridge the gaps 36, holding the adjoining portions of the breakout panels 12, 16 to one another.

The panel 10, including the breakout panels 12, ..., 24 and the tabs 34, is preferably of integral construction, formed by a conventional low pressure injection molding process, using a structural foam. The resultant construction produces a very stiff, but very light panel having a tough outer skin but a lighter, low density inner core, with the tabs being frangible.

When it is desired to remove or "break-out" one or more of the breakout panels 12, ..., 24, one need only twist or otherwise break off the frangible tabs 34 that hold the particular breakout panel 12, ..., 24 in place in the panel 10. For example, as illustrated at 40 by the arrows 41, 42, the tab 34 may be twisted one or the other directions illustrated by the arrows 41, 42, to remove the tab 34, and the remaining tabs that hold the breakout panel 14. A pair of conventional pliers may be used to grip and twist the tabs 34 for removal.

Note that since the tabs are formed on the back surface 32 of the panel 10, rather than the front surface 48, any scarring or "witnesses" left by removal of the tabs 34 will either be on the removed breakout element(s), or the inner, unseen, back surface 46 of the remaining portions of the panel 10. Thus, the necessity of hiding or masking such remaining scars or witnesses is removed.

In summary, there has been disclosed a panel construction having breakout elements held in place until removal by a plurality of frangible tabs that, when removed, leave no viewable, unsightly witnesses.

While there has been a complete and detailed disclosure of the invention, it will be evident to those skilled in the art that various modifications and variations may be made without departing from the true spirit and scope of the invention.

What is claimed is:

1. A faceplate having a normally viewable surface and a normally non-viewable surface comprising:
   a frame having an opening and an circumferential surface facing said opening;
   a brakeout panel having a perimetrical side surface spaced from and facing said circumferential frame surface, thereby forming a gap therebetween;
   a plurality of connectors coupling said breakout panel to said frame, each of said connectors having a body portion, including a first portion substantially overlapping said breakout panel and a second portion substantially overlapping said frame, said first and second portions being frangibly connected to said breakout panel and frame, respectively, said body portion projecting out from the normally non-viewable surface and being constructed to be grasped and rotated to separate one of said connectors from the breakout panel and the frame.

2. The faceplate of claim 1, wherein said frame, breakout panel and connectors comprise an integrally molded structure.

3. The faceplate of claim 2, wherein said frame, breakout panel and connectors comprise structural foam.

4. The faceplate of claim 1, wherein each of said connectors is elongated.

5. The faceplate of claim 3, wherein each of said connectors has a rectangular configuration.

6. A bezel for accommodating products of different configuration, said bezel having a normally viewable surface and a normally non-viewable surface, comprising:
   a body member constructed to define a first breakout opening and a second breakout opening;
   a first breakout member positioned in said first breakout opening;
   a second breakout member positioned in said second breakout opening; and
   a plurality of connectors, each connector having a body portion, including first and second end portions, each first end portion substantially overlapping and being frangibly connected to said non-viewable surface of said body member, and each second portion substantially overlapping and being frangibly connected to one of said breakout members;
   said body portion of each of the connectors projecting out from said normally non-viewable surface and being constructed to be grasped so that rotation of one of connectors associated with one of said breakout members separates said one of said connectors from said one of said breakout members permitting removal thereof.

7. A breakout panel construction, comprising:
   a generally planar panel having a front surface normally positioned for viewing and a back surface normally positioned for non-viewing, and an inner periphery defining an opening from the back surface to the front surface;
   a breakout element sized and configured to be located in the opening, the breakout element having an outer periphery in juxtaposed relation with the inner periphery of the panel, forming a gap therebetween; and
   a plurality of tangible tab means projecting out from the back surface of the panel extending across the gap holding the breakout element in the opening, the plurality of tab means being configured for removal to allow the breakout element to be removed from the opening by rotation of the tab means in a plane generally parallel to the back surface of the panel.

8. The breakout panel construction of claim 7, wherein the panel, the breakout element and the plurality of tab means form an integral construction.

9. The breakout panel of claim 8, wherein the panel, the breakout element, and the plurality of tab means are formed by a low pressure injection molding process.

10. The breakout panel construction of claim 8, wherein the panel forms a bezel adapted to be attached to a cabinet.

* * * * *